United States Patent
Flaviani

[15] 3,700,107
[45] Oct. 24, 1972

[54] APPARATUS FOR RECOVERY OF FLOATING SUBSTANCES

[72] Inventor: Edmond Flaviani, 719 28th Avenue, San Francisco, Calif. 94121

[22] Filed: Nov. 18, 1970

[21] Appl. No.: 90,544

[52] U.S. Cl. .............................210/242, 210/DIG. 21
[51] Int. Cl. ...........................C02b 9/02, E02b 15/04
[58] Field of Search .................210/83, 242, DIG. 21

[56] References Cited

UNITED STATES PATENTS

| | | | |
|---|---|---|---|
| 3,576,257 | 4/1971 | Yates | 210/DIG. 21 |
| 3,546,112 | 12/1970 | Will et al. | 210/DIG. 21 |
| 3,245,539 | 4/1966 | Earle | 210/DIG. 21 |
| 1,860,819 | 5/1932 | Schamberger | 210/DIG. 21 |
| 3,539,508 | 11/1970 | Bulkley et al. | 210/DIG. 21 |

Primary Examiner—Samih N. Zaharna
Assistant Examiner—T. A. Granger
Attorney—Arlington C. White

[57] ABSTRACT

The disclosure relates to a propelled hull having an open front as well as an open rear, a scoop removably mounted on the hull at its open front for picking up from the surface of water mixtures of water and pollution material floating thereon, together with an upright partition fixedly secured in said hull, a housing supported on said partition, a plurality of rotatable cylinders mounted in vertically arranged engagement to one another within said housing; said cylinders having spirally arranged grooves in the peripheries thereof for transfering picked up liquid material from one cylinder to another, a separator on said hull in communication with the uppermost cylinder for receiving mixtures of liquids from said uppermost cylinder and for separating one liquid from another for discharge into separate areas, means for rotating said cylinders, and means at the rear of said hull for discharging separated liquids from said separate areas of said hull to a remote location.

11 Claims, 20 Drawing Figures

INVENTOR
EDMOND FLAVIANI
BY Arlington L White
ATTORNEY

INVENTOR
EDMOND FLAVIANI
BY Arlington L. White
ATTORNEY

INVENTOR
EDMOND FLAVIANI
BY
ATTORNEY

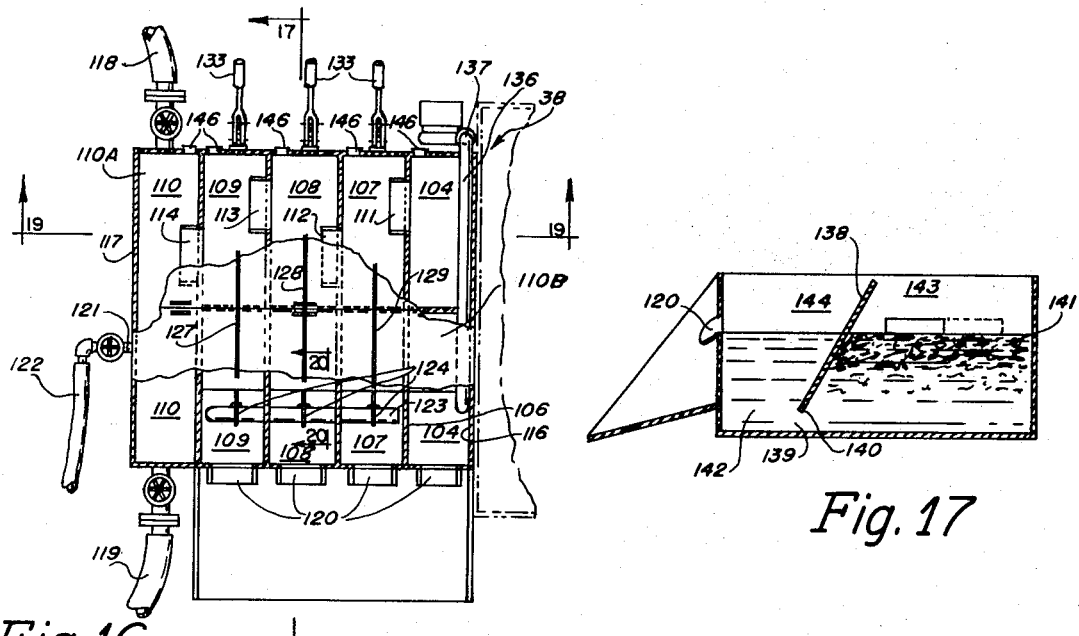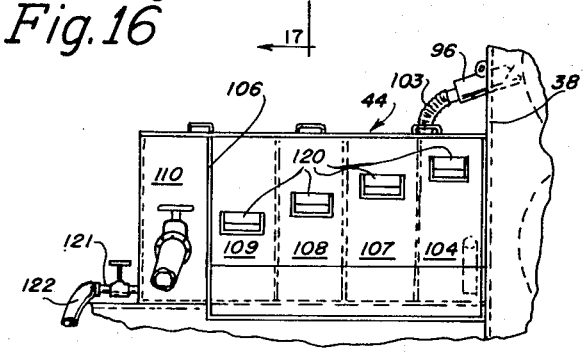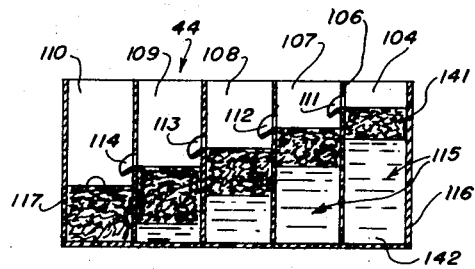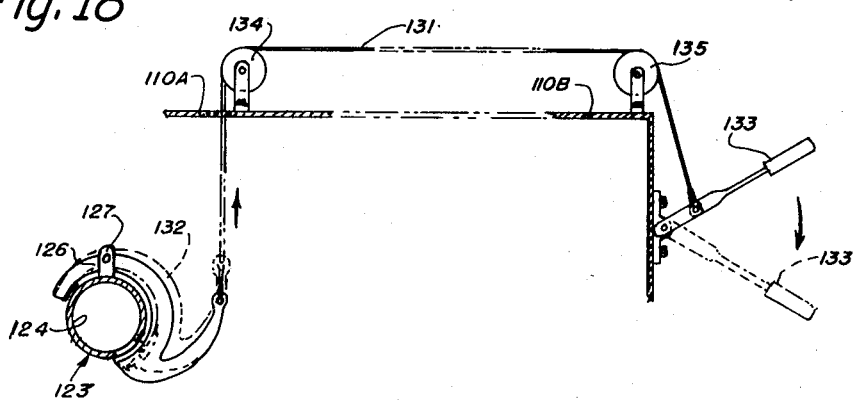

APPARATUS FOR RECOVERY OF FLOATING SUBSTANCES

Heretofore considerable attention has been given to the preservation of the natural resources of this country and more recently equipment has been devised for overcoming damage to existing ecological environments, particularly in respect to solving the ecological problem of pollution materials either floating or suspended in off-shore waters, lakes and rivers to minimize the destruction of fish and other water-dwelling creatures as well as the destroying of beaches and shore installations. Many Letters Patent of the United States are directed to devices, apparatus and equipment for alleviating the unsafe conditions arising from polluted waters. Some of the recently issued patents include U. S. Pat., No. 3,219,190 issued on Nov. 23, 1965 to Thune wherein a device for removing oil and flotsam from the surface of water is disclosed and claimed comprising a vessel with a partially open bow, together with a weir disposed interiorly of the hull and a skimming board to move waters to and over the weir; U.S. Pat., No. 3,221,884, issued on Dec. 7, 1965 to Muller which discloses a pair of flexible pipes floatable upon water, together with suction nozzles associated with the pipes for drawing surface material into the pipes and subsequent separation from the water on which it floats; U.S. Pat., No. 3,237,774, issued Mar. 1, 1966 to Schuback which discloses apparatus for lifting scum and other surface pollutants from waters comprising two floats having a channel therebetween, a gimbal mounted collecting tank in the channel between the floats which remains or is thereby maintained horizontal irrespective of the roll or pitch of the floats; U.S. Pat. No. 3,259,245 to Earle which discloses a system including a storage tank and pick-up rotatable drums for collecting and separating mixtures of two stratified liquids to recover one liquid separately from the other; and U.S. Pat. No. 3,358,838, wherein there is disclosed apparatus for separating one constituent of a liquid mixture utilizing a rotor dipping into a body of the mixture. While there has been moderate success in the employment of some of the aforementioned equipment, the cost of manufacture and maintenance thereof is quite expensive in relation to the value of the recovered pollutants on water such as the recovery of spilled oil. The present invention is directed to the recovery of floating substances at a reasonable cost for the equipment and a minimum of expense in effecting the solution of the ecological problems involved.

A primary object of the invention is to provide apparatus for recovering floating substances which has the capacity of picking up pollution material on the surface of rough waters as effectively as from calm waters and in a minimum of time with a minimum of labor.

Another important object of the present invention is to provide apparatus of the indicated nature which is additionally characterized by the continuous separation of the pollution material from the picked up mixtures of pollution material and water during the time of collecting or recovering the same.

A still further object of my invention is to provide apparatus of the aforementioned character which affords the automatic unloading of collected and separated material into an associate vessel or into storage tanks on shore.

Another object of the invention is to provide for the prevention of apparatus-destructive material being included in the recovered mixtures.

A still further object is to provide apparatus of the indicated nature which achieves the purpose of collecting, separating and storing surface pollutants with a minimum of complex mechanisms.

Other objects of the invention, together with some of the advantageous features thereof, will appear from the following description of a preferred embodiment of the invention, and the best mode and manner of constructing the same, which is illustrated in the accompanying drawings. However, it is to be understood that the illustrated apparatus can be constructed in a plurality and variety of ways, all within the scope of the hereinafter claimed inventions.

Referring to the drawings:

FIG. 16 is a top plan view, partly cut away, of the separator component of my improved recovery apparatus, this view showing the conduits and control valves for unloading the separator.

FIG. 17 is a sectional elevational view of the separator component of the invention, this view being taken on the line 17—17 of FIG. 16.

FIG. 18 is a reduced side elevational view of the separator component showing water outlets in the different compartments as well as illustrating in fragmentary view pollutant discharge and drain conduits.

FIG. 19 is a sectional side elevational view of one side of the separator component, this view being taken on the line 19—19 of FIG. 16 and illustrating pollutant flow from compartment to compartment with gradual reduction of the water content of the picked up mixtures.

FIG. 20 is an enlarged sectional elevational view of a portion of the separator component with schematic showing of the control cables for closing and opening valves in the separator outlets, this view being taken on the line 20—20 of FIG. 16.

In its preferred form, the apparatus of my present invention for recovery of floating substances, and the best mode and manner of constructing the same, preferably comprises a generally catamaran-type propelled water craft including a pair of floatable barges arranged and supported in substantially parallel relationship to one another, and an intermediate hull, together with pick-up means on said hull for raising from the water on which the draft is floated mixtures of water and surface pollutants as the hull is advanced in the water, a separator device supported on said hull in communication with an outlet of said pick-up means for receiving said mixtures and separating the pollutants from the water for discharge into a predetermined area, and means for transferring the separated pollutants from said area to said barges.

Figure 1:
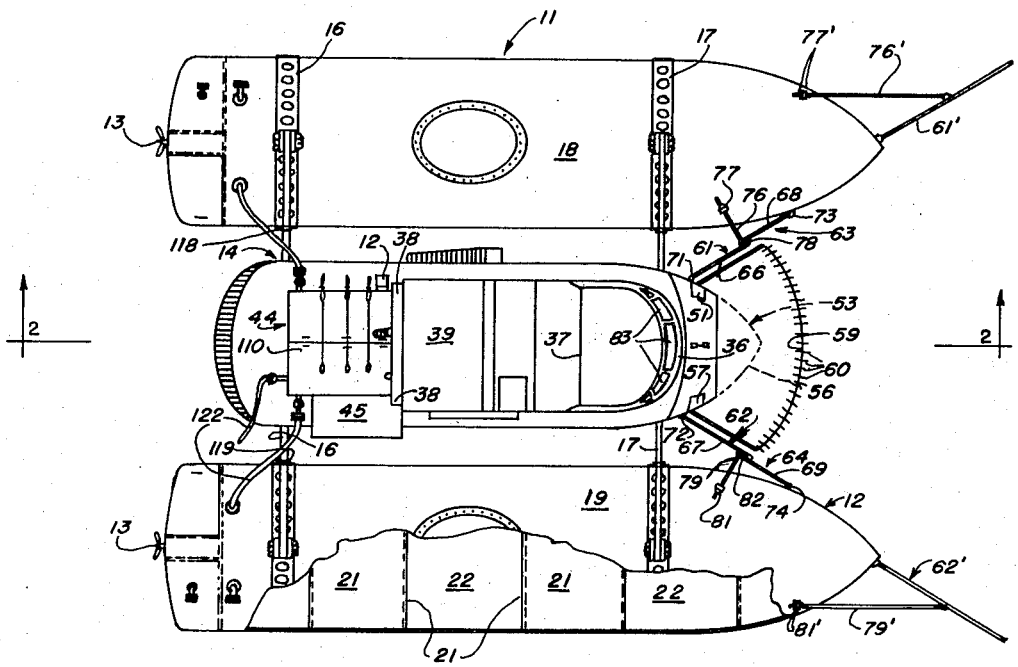
FIG. 1 is a plan view of a preferred embodiment of the invention.

In accordance with my present invention, I provide a pair of floatable tanks or barges 11 and 12 upon the sterns of which are mounted suitable propulsion means for the entire craft, such as the motor-driven propellers 13 suspended from the sterns and immersed in the water upon which the tanks 11 and 12 are floated, and I arrange such tanks or barges in substantially parallel relationship to one another as clearly shown in FIG. 1 of the annexed drawings, on opposite sides of an intermediate or central hull or chamber 14 to which the two barges are rigidly connected by means of pairs of thwarts 16 and 17 fore and aft of the craft to afford a strong unitary floatable structure having full manouverability in and about the water on which it rides. Each of the barges 11 and 12 is constructed with a relatively large area below decks 18 and 19, respectively, thereof which conveniently serves to house a series of air-tight and water-tight floats 21 alternating with chambers 22 for receiving and carrying recovered pollutant material; such chambers being provided by means of the vertical walls of the floats 21 which extend from the underside of the barge decks to adjacent to the bottoms of the barges leaving space for establishing communication from one chamber 22 to another such pollutant receiving chamber 22 whereby the recovered material rises to the same level in all chambers 22 of each barge 11 and 12 until unloaded by suitable pumps and conduits, not shown, for storage or other disposal thereof.

Figure 3:
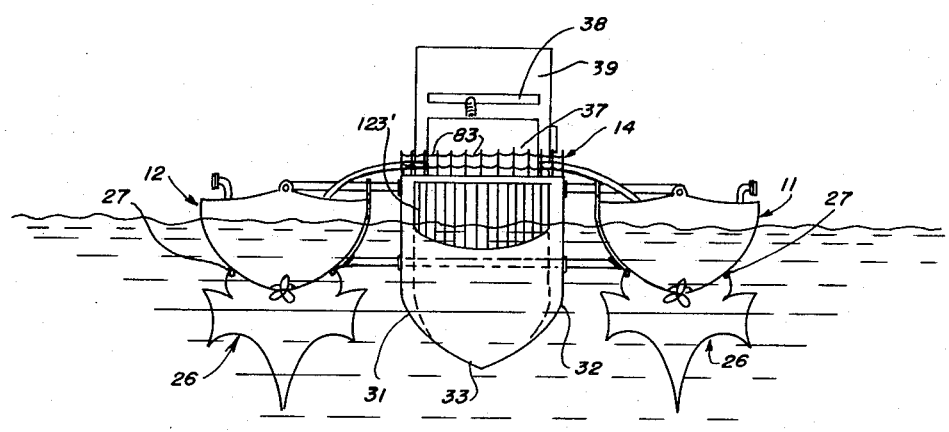
FIG. 3 is a rear elevational view of the embodiment shown in FIG. 1.
Figure 4:
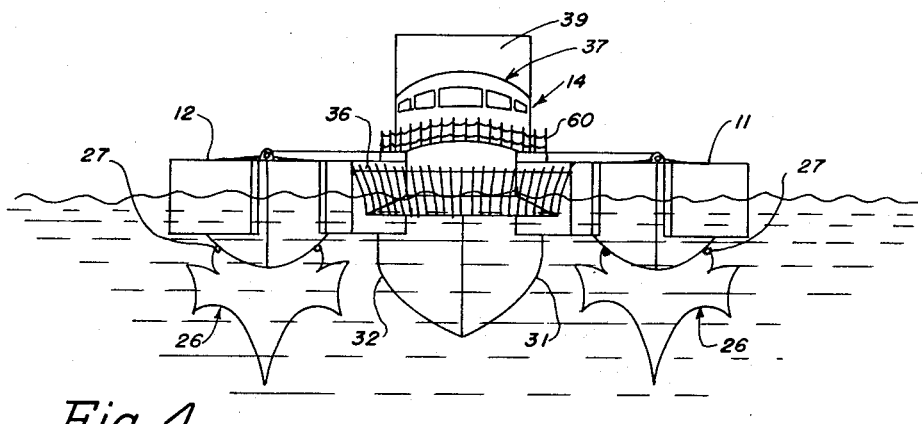
FIG. 4 is a front elevational view of the preferred embodiment of the invention.
Figure 5:
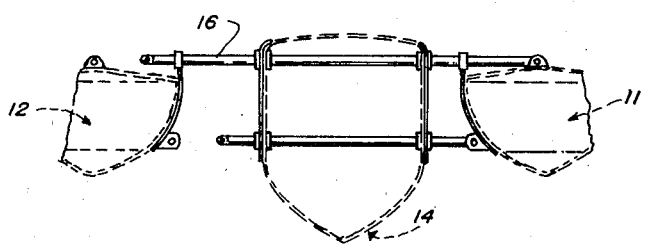
FIG. 5 is a schematic elevational view of the components for fastening together the floating barges of the preferred embodiment of the invention.
Figure 6:
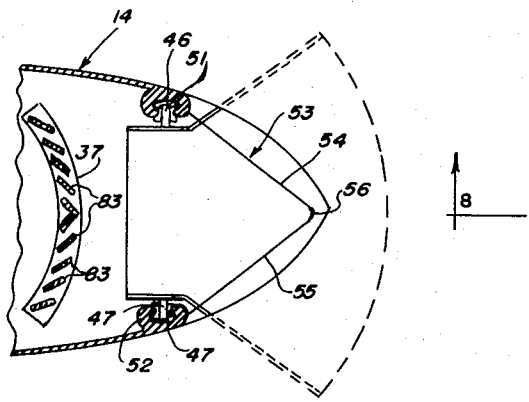
FIG. 6 is a fragmentary longitudinal sectional view of the bow of the vessel comprising a preferred embodiment of the invention.

For purposes of lending stability to the entire craft, a combined stabilizer and keel unit 26 is removably mounted by means of an adapter 27 to the bottoms of each barge, see FIGS. 3 and 4, in the same manner as similar units are removably mounted upon the bottoms of the articulated floatable drums, all as described in my co-pending application for U. S. Letters Patent, Ser. No. 73,001, filed Sept. 17, 1970, and entitled "Oil Slick Confinement Equipment," now U.S. Letters Pat., No. 3,651,647.

In accordance with my invention, I preferably construct the hull 14 of my improved apparatus to a generally U-shape in cross-section, see FIG. 3, and provide the same with double U-shaped side walls 31 and 32, to afford floatability thereof, as well as a bottom 33 having a plurality of small perforations 34 therein which extend throughout the length and width of the hull bottom and which are approximately 1 inch in diameter to allow some of the water upon which the hull or chamber is floated to enter within as well as to flow out of the same, making the hull section 14 of the craft practically weight-less and keeping the same in constant engagement with the water.

As a best mode and manner of constructing my improved pollutant-recovery apparatus, the hull section 14 thereof is so fashioned as to be open at the bow as well as at the stern thereof and it supports a series of main elements including a self-floating scoop 36 for skimming the surface of the water and devised for guiding the material picked up towards the rear and bottom of the hull, as well as supports a barrier 37 for breaking the on-rush of waters and diverting the same. In addition, the hull 14 supports an upright wall or partition 38 having an arched base for allowing flow of water from the front to the rear of the craft. Such partition 38 is at approximately three-quarters of its length from the bow of the hull, to which a specially constructed housing 39 is secured for mounting and encasing therein a plurality of cylinders, which are generally designated by the reference numerals 41, 42 and 43 in the annexed drawings and which serve to lift mixtures of water and pollutant material, picked up by the scoop 36, to the upper portions of the housing for transfer to a hull-supported separator 44 wherein the pollutant material is separated from the mixtures and the separated water is returned to the sea, lake or river on which the hull 14 is propelled. The rear section of partition 38 also supports in conjunction with the sides of hull 14 a compartment 45 which may serve as an engine room. All of the joints between the supported units and the side walls of hull or chamber 14 are suitably caulked to provide the desired water-tightness and insure against leakage.

Figure 7:
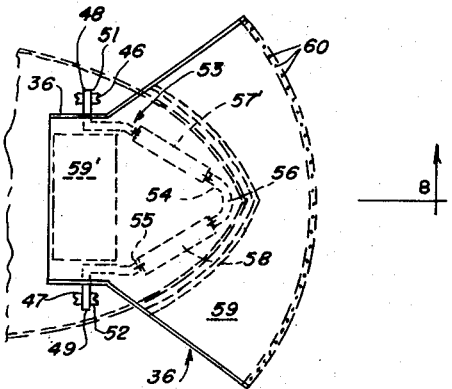
FIG. 7 is another fragmentary longitudinal sectional view, partly in dotted lines, illustrating the relationship of the bow and the guiding rails for the lateral movement of the scoop component of the preferred embodiment of the invention.
Figure 9:
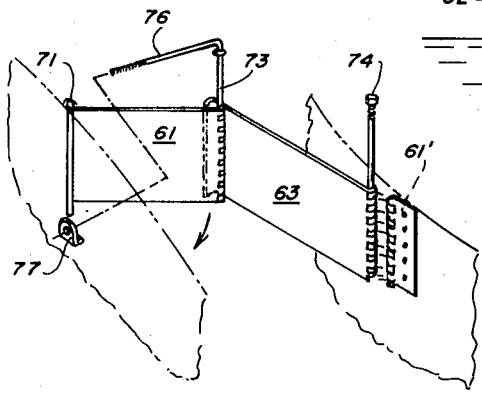
FIG. 9 is a fragmentary elevational view of a portion of the bow of the vessel illustrating the foldability of lateral guide extensions in relation to a fence attachment at the bow.
Figure 8:
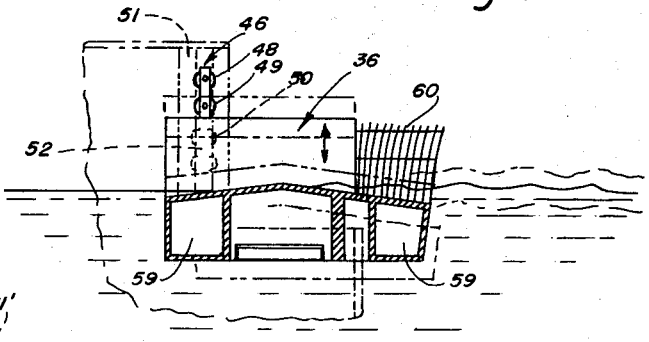
FIG. 8 is a sectional elevational view of the bow of the vessel, this view being taken on the line 8—8 of FIG. 7 and illustrating the vertical movement of the scoop.
Figure 10:
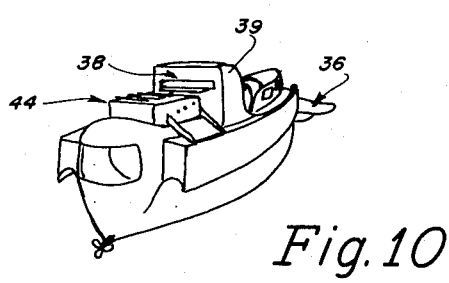
FIG. 10 is a reduced perspective view of a modified embodiment of the invention.
Figure 11:
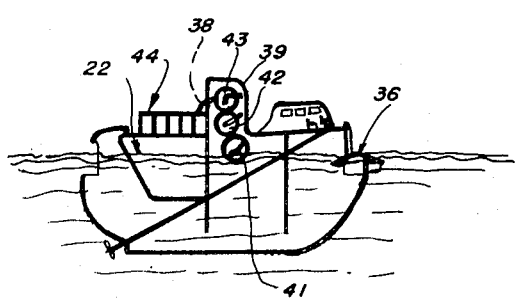
FIG. 11 is a reduced side elevational view of the modification shown in FIG. 10.

While any suitable mounting for the self-floating scoop or skimmer 36 can be provided, I preferably fasten to the hull 14 in transverse alignment with one another a pair of tracks 46 and 47 which, as shown, are installed adjacent to the prow of hull 14 and which movably receive in up and down movement a series of freely mounted wheels 48, 49 and 50 which are journaled at vertically spaced intervals in a pair of housings 51 and 52 secured in perpendicularly disposed positions on the inner ends of a V-shaped apron 53 having converging perpendicular side walls 54 and 55 which merge into an apex or nose 56 at the extreme front of the hull 14. Journaled in the lower portions of each converging side wall 54 and 55 are a pair of elongated rollers 57 and 58 which ride upon the inner surfaces of the sides of the hull in an up and down movement as the apron 53 moves in response to the up and down movement of scoop 36 by virtue of its engagement with the water upon which the hull 14 is moved in unison with the connected propelled barges 11 and 12. Supported on and below the wide diverging apron section 53 of the scoop 36 is a relatively wide diverging, and water-engaging float 59 which carries at its front, arcuate end a series of perpendicularly mounted bars 60, see FIG. 1, to fend off large objects which might otherwise gain access to the inside of the hull. A second float 59' is carried under the rear section of the scoop 36, and is shown in dotted lines in FIG. 7.

In order to guide pollutant-carrying waters into the scoop 36 for pick-up thereby, I provide diverging inner foldable extensions between the hull 14 and the barges 11 and 12, such extensions being generally designated by numerals 61, 62, 63 and 64 and being mounted at opposite sides of the hull and associated barges 11 and 12, as particularly illustrated in FIG. 1 of the annexed drawings. Inner foldable extensions 61 and 62 are formed of pivotally connected links 66, 67, 68 and 69 respectively with the inner ends of links 66 and 67 pivotally connected to rings 71 and 72, respectively, at aligned opposite sides of hull 14, and with the outer ends of links 68 and 69 pivotally connected to rings 73 and 74, respectively on the inner sides of the barges 11 and 12, respectively. A rod 76 is slidably connected at its inner end to a ring 77 on barge 11 and fixedly fastened to the pivot 78 between links 66 and 68 at one side of hull 14 to effect the folding of such links to the side of the hull when not in use, and a similar rod 79 is slidably connected at its inner end to a ring 81 on barge 12 and at its outer end to the pivot 82 between links 67 and 69 of such foldable extensions to effect folding thereof adjacent the other side of hull 14 when not in use. In addition, I provide outer extensions 61' and 62' which are mounted at the front of the barges 11 and 12, respectively and held in extended diverging positions, as shown in FIG. 1, by retractable rods 76' and 79' movably retained in rings 77' and 81' on barges 11 and 12, respectively. Upon retraction of rods 76 and 79, the extensions 61' and 62' can be folded back and held against the sides of the barges when not in use.

In accordance with the present invention, I mount on hull 14 adjacent to the inner or discharge end of scoop 36, the vertically disposed barrier 37 which conveniently is constructed of a plurality of vertically disposed spaced apart slats 83 which are arranged so as to present a generally convex outer surface which the onrushing scooped up mixtures of pollutant material and water engage to be slowed down and turned by such barrier or breaker 37 laterally. The housing 39 and its encased drums are protected by the barrier 37 from such onrushing or turbulent water and causes a major portion of the mixtures to sink lower into the hull where the mixtures are met by waters entering through the perforations 34 in the bottom 33 of the hull to cause the pollutants to separate out from the mixtures to an appreciable extent and to rise toward the lowermost cylinder 41 of the series of cylinders 41, 42 and 43 rotatably mounted in housing 39. This breakup of the mixtures and the slowing down of the rearward onrush of the same by the upright barrier 37 with its convex forwardly presented surface effects a simultaneous partial separation of the pollutants from the water of the mixtures and to an appreciable extent precludes the return of the pollutants to open waters again along with the water passing rearwardly under the arched bottom of upright partition 38.

Figure 12:
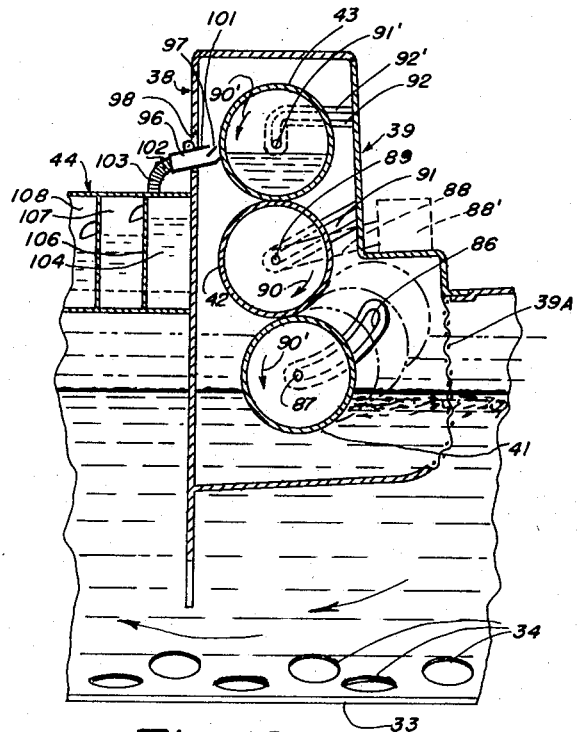
FIG. 12 is a fragmentary sectional elevational view of a portion of the preferred and modified embodiments of the invention, this view showing the arrangement of adjustable pick-up drums mounted within a housing, as well as a portion of a separator with discharge spout from housing to separator.
Figure 13:
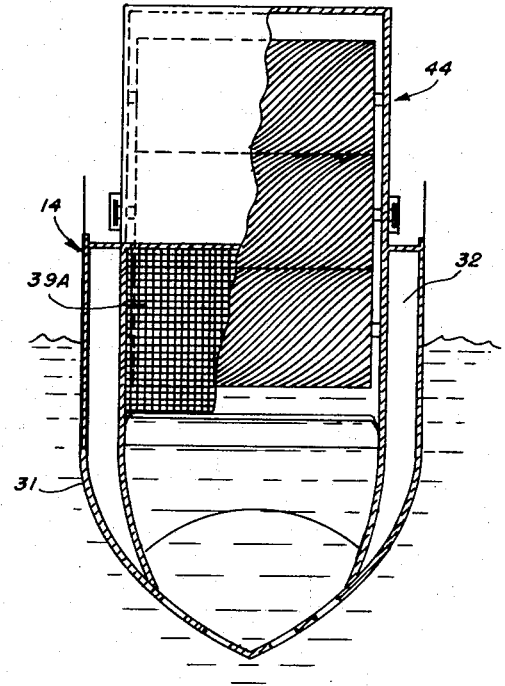
FIG. 13 is a sectional elevational view of the housing shown in position on the hull of the preferred embodiment of the invention and illustrating the screen in the lower section thereof to protect the housed drums from damage from floating debris.
Figure 14:
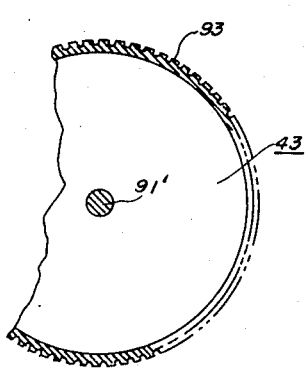
FIG. 14 is a fragmentary plan view of one of the rotatably mounted pick-up drums with grooved periphery.

As particularly illustrated in FIG. 12 of the annexed drawings, the lower section of housing 39 is enlarged forwardly of the same to permit the formation therein of suitable guide tracks 86 of which but one is shown in this view, in opposite sides of the housing. Tracks 86 receive the axle 87 of lowermost drum 41 and conveniently is curved upwardly to accommodate for the upward movement of the drum due to the surging action of the water mixtures in which the lowermost drum is partially immersed. Driven cylinder 42 is positioned within housing 39 by means of guide tracks 88 formed in opposite sides of the housing 39, of which but one track 88 is shown in this view; such tracks receiving the axle 89 of drum 42 which is thus pushed into position overlying and engaging the periphery of lowermost drum 41. Similarly, the uppermost drum or cylinder 43 is positioned in overlying relation to driven cylinder 42 with its axle 91' within the right-angle track 92 formed in the front of the upper section of housing 39; such axle 91' being placed into position by feeding the same through straight section 92' of track 92. The axle 91' of the uppermost drum 43 can move up and down within the vertical section of track 92 to accommodate for the thickness of the pollutant transferred to it from the contacting periphery of intermediate driven cylinder 42. It is to be noted that I fashion the peripheries of all of the drums 41, 42 and 43 with spirally arranged grooves 93 therein, see FIG. 14, within which the picked-up pollutant material will be received and temporarily retained as it passes from the lowermost cylinder 41 to the uppermost cylinder 43 during the driving and rotation of driven cylinder 42. It is to be understood that such grooves 93 can vary in width dependent upon the viscosity of the particular pollutant material being picked up. The driving connections, not shown, between the prime mover 88' and the shaft 87 of drums 42 are conventional and not, per se, a part of the present invention. Suffice is it to say that the power applied to the shaft 87 of drum 42 may cause it to rotate in a clockwise direction or in a counter-clockwise direction, and that the engaging lower and upper cylinders 41 and 43, respectively, will therefore be rotated in a direction opposite to the direction of rotation of driven drum 42, see arrows 90 and 90'.

Figure 2:
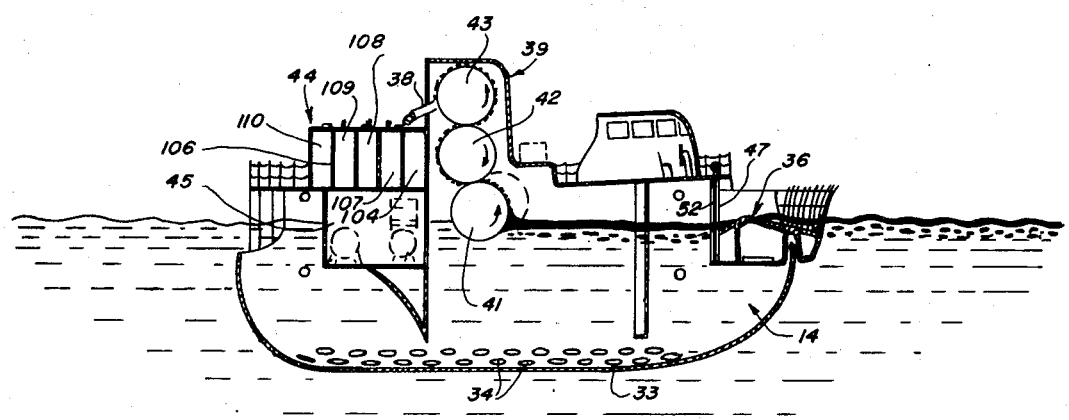
FIG. 2 is a sectional elevational view thereof, taken on the section line 2—2 of FIG. 1.
Figure 15:
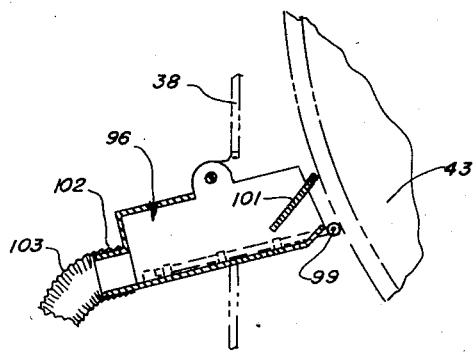
FIG. 15 is an enlarged detail, partly in sectional elevation, of the means for transferring picked up mixtures of water and pollutant material from the pick-up drums to the separator of a preferred embodiment of the invention.

In accordance with my present invention, I provide means for collecting the picked up mixtures of pollutant material and water from the uppermost cylinder 43 in housing 39 and for transferring the same to the separator 44. While any suitable collecting and transfering means can be employed, I preferably employ the mechanisms illustrated in FIGS. 12 and 15 of the annexed drawings which comprises a transversely extending trough 96 which is supported and suspended on partition 38 and projecting within the housing 39 with its open forward end communicating with the periphery of uppermost cylinder 43 therein. The mechanism includes a transversely extending roller 99 which is mounted for rotation and adjacent to the forward end of trough 96 so as to ride upon the cylinder 43, and also includes an inclined scraper 101 which is mounted within the trough on cross-bars, not shown, and which has its forward edge in close proximity to the periphery of cylinder 43 to effect collection of pollutant material therefrom and to carry the same into the trough and out of the same through outlet conduit 102 formed integral with the bottom of the trough. I provide a flexible hose 103 for attachment to outlet conduit 102 of the trough; such hose 103 extending to separator 44 and effecting the emptying of the mixture of pollutant material and some water into front compartment 104 of the separator 44 which conveniently is divided by means of partitions 106 into a plurality of successively arranged additional compartments 107, 108, 109 and 110 from front to rear of the separator, see FIG. 2.

As particularly illustrated in FIGS. 16 and 19, of the annexed drawings, access to the interiors of compartments 104, 107, 108, 109 and 110 can be obtained by opening a pair of lids 110A and 110B which are hingedly connected to the tops of the opposite sides of the separator. As shown, the dividers 106 are formed with a series of openings or spillways 111, 112, 113 and 114 which establish communication between adjacent compartments and which conveniently are off-set laterally in relation to one another in a zig-zag pattern and at progressively lower levels in the partitions 106 from front to rear of the separator so that the mixtures of pollutant material and water, designated generally by the reference numeral 115, will cascade in a side to side motion from the front 116 to the rear 117 of the separator 44 where the separated pollutant material will move out of end compartment 110 under gravity through valve-controlled hoses 118 and 119, see FIG. 16 for disposal into barges 11 and 12. The separated out water is returned from the water chambers, hereinafter described, of the several compartments 104, 107, 108 and 109 through discharge chutes 120 which establish communication between such water chambers and the open waters from which the mixtures of pollutant material and water have been collected and on which the craft rides. A valve-controlled drain outlet 121 is provided in the bottom of each pollutant chamber hereinafter described of the separator as well as in the bottoms of all compartments and serve to completely empty and drawing off any water that may have gained access to such as well as all remaining liquids in the compartment through outlet flexible valve-controlled hoses 122.

In order to facilitate the flow of the mixtures of pollutant material and water from compartment to compartment, 104, 107, 108 and 109, and to maintain the water level above the open space under the slanted panels, hereinafter described, which divide each of such partitions transversely to afford smaller pollutant chambers and water chambers, I install an inclined pipe 123 within separator 44 which communicates at its inlet with compartment 104 and which is fixedly secured by sealed joints in openings in successive partitions 106 at the water-chamber side of the separator. Formed in pipe 123 at intervals along the same are outlets 124 opening into compartments 107, 108 and 109 and controlled by a series of manually operable valves 126. A convenient manner of effecting the actuation of valves 126 is through a series of links 127, 128 and 129 each connected at their lower or inner ends to a valve 126 and at their upper or outer ends to a cable 131, see FIG. 20, secured to a spring 132 and actuated by levers 133. The actuating cable 131 is trained over a pair of idler pulleys 134 and 135 journaled in brackets secured to the lids or closures 110A and 110B of the separator. Pulling of a lever 133 opens a connected link 127, 128 or 129 to open a valve 126 to allow water from pipe 123 to be introduced into a corresponding water chamber side of one of the compartments 107, 108, or 109 to raise the level of the water therein. Should the level of the combined water and pollutant material fall, for any reason, below the desired level, such as below the inlet to pipe 123 in compartment 104, additional water is supplied to such compartment through supply pipe 136 leading from the open waters up the side of the separator 44 and emptying into a compartment 104 by starting a pump 137, see FIG. 16, controlling flow in such pipe, the water supply system including a foot-valve, not shown immersed in the open water.

In accordance with my present invention, the compartments 104, 107, 108, 109 and 110 are divided transversely by means of slanting panels 138 which are rigidly secured to the end walls and partitions 106 therebetween by any suitable means, such as welding, and which extend from the tops of the compartments to adjacent to the bottoms thereof, see FIG. 17 of the annexed drawings, leaving a space 139 between the lower end 140 of each panel 138 and the bottom of the compartment. In FIG. 17 I have designated the floating pollutant material of the mixture generally by the reference mineral 141 and the water by the numeral 142 and it is to be noted that by virtue of the division panels 138 the compartments are each divided into a pollutant material-containing chamber 143 and a water-containing chamber 144 with the pollutant clearly separated from the water, the latter occupying not only chamber 144 but also the space 139 below the panel 138 as well as the lower portion of chamber 143 on the side of the separator containing water outlet chutes 120; the pollutant material rising by capillary action to some extent along the panel 138 in chamber 143 and to the top of the mixture because lighter than water on which it floats, see FIG. 17. Visual indicators 146 are provided in the side of the separator 44 to observe the level of the mixtures in the various compartments and thus determine whether additional water should be introduced into first compartment 104 through pipe 136 to bring the level of the water up in each compartment above the spaces 139 defined by the lower end of slanted panels 138 and the bottoms of the compartments 104, 107, 108, 109 and 110.

In FIG. 19 of the annexed drawings, I have illustrated by stippling and reference numeral 141 the floating pollutant material, such as oil, with underlying water 142 in each of the compartments of the separator 44. It is to be noted that the flow of the combined pollutant material and water is continuous from the front compartment 104 to the rear compartment 110 as long as the mixtures are introduced into compartment 104 with the gradual diminution of the water content in each compartment from front to rear by the action of slanting panels 138 up which the pollutant material rises in one transverse chambers of each compartment, say the chambers 143, and some of the water passing out chutes 120 to the open waters from the transverse chambers 144 which the water is separated out by the panels 138. As indicated at the left side of FIG. 19, the separated out pollutant material in end compartment 110 flows out both sides of the separator 44 by force of gravity and through hoses 118 and 119 passes into the barges 11 and 12.

I claim:

1. Apparatus for recovery of floating substances comprising a collection chamber with open ends, elongate sides and a perforate rounded bottom supported on the surface of a body of water by barges arranged at each side of said chamber whereby the open ends of said chamber intersect the surface of said body of water, a self-floating apron movably supported on said sides adjacent to one end of said chamber, a scoop movably mounted on said apron for scooping up mixtures of pollutant material and water from the surface of said body of water as said barges are advanced therethrough, propulsion means on said barges for advancing the same and said chamber over the surface of said body of water, an upright barrier secured to said elongate sides adjacent to the rear end of said scoop for meeting onrushing scooped up mixtures of pollutant and water and diverting the same laterally, an upstanding transverse partition supported on and between said elongate sides of said chamber behind and in spaced relation to said barrier; said partition having a transverse opening in the upper portion thereof and an arched bottom, a housing secured to said partition and extending toward said barrier, a plurality of water-tight cylinders encased in and rotatably mounted on said housing in superposed engaging relationship to one another and consisting of a lowermost cylinder engaging latterly diverted rearwardly onrushing mixtures of pollutant and water to pick up the same, an uppermost cylinder adjacent to said transverse opening in said partition, and an intermediate cylinder having its periphery engaging the periphery of the uppermost and the lowermost cylinders of said plurality of cylinders, means for driving said intermediate cylinder, a separator supported by said elongate sides of said chamber adjacent to the other end thereof, and means for effecting the transfer of mixtures of pollutants and water from the periphery of said uppermost cylinder to said separator wherein said mixtures cascade from one end thereof to the other and are separated apart, and means for removing the separated out pollutants from said separator.

2. Apparatus for recovery of floating substances as set forth in claim 1, and a plurality of perpendicularly disposed bars affixed to the outer edge of said floating apron fending off large pieces of material to prevent picking up of the same unto said hull.

3. Apparatus for recovery of floating substances as set forth in claim 1, and a roller rotatably mounted on the bottom of each depending side of said floating apron for engaging and riding upon opposite sides of said hull at the bow thereof to prevent displacement of said apron.

4. Apparatus for recovery of floating substances as set forth in claim 1 wherein the means for movably supporting said floating apron on said hull comprises a pair of perpendicularly disposed tracks on opposite sides of said hull adjacent to the bow thereof, a bracket on the inner ends of the sides of said floating apron, and a plurality of rollers journaled in said brackets and riding upon said tracks.

5. Apparatus as set forth in claim 1 wherein said barrier consists of a plurality of vertically disposed spaced apart slats arranged to present a convex surface to the forward part of said hull to meet and diverge onrushing successive scooped-up mixtures of pollutant material and water as the hull is moved through waters containing surface pollutants.

6. Apparatus as set forth in claim 1 wherein each of said cylinders encased in said housing comprises an elongated water-tight drum, a central shaft extending therethrough and a periphery having a spirally arranged groove extending longitudinally thereof in which pollutant material and water mixtures are received and carried.

7. Apparatus as set forth in claim 1, and a plurality of tracks formed in said housing at different levels thereof in which the shafts of said cylinders ride.

8. Apparatus as set forth in claim 1, wherein said separator comprises a plurality of successive compartments of substantially the same depth from front to rear thereof, and inclined panels in each of said compartments dividing the same into transverse chambers and extending from the tops thereof to adjacent to the bottoms thereof; whereby said chambers may be filled with separated pollutant material and water contained in mixtures thereof moved into said compartments.

9. Apparatus as set forth in claim 1 wherein said separator comprises a plurality of partitions each having an opening therein; said partitions dividing the separator into a plurality of compartments for receiving mixtures of a pollutant and water moving through the openings of said partitions, and a plurality of spouts attached to said partitions at said openings to guide the moving mixtures into successive compartments.

10. Apparatus as defined in claim 9, and an inclined pipe extending between a plurality of said compartments through which water may be passed to maintain a desired level of mixtures in each compartment, said pipe having a plurality of valve-controlled openings therein arranged within said compartments for discharging additional water thereinto.

11. Apparatus as set forth in claim 1, and means for removing separated out pollutants from an end compartment at the rear of said separator, and means for discharging separated out water from the sides of the remaining compartments.

* * * * *